(12) United States Patent
Agami et al.

(10) Patent No.: US 8,939,772 B2
(45) Date of Patent: *Jan. 27, 2015

(54) METHOD OF PLACING AND ABSORBENT ARTICLE

(75) Inventors: Sion Agami, Mason, OH (US); Miguel Alvaro Robles, Wyoming, OH (US); Dean Larry Duval, Lebanon, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 474 days.

This patent is subject to a terminal disclaimer.

(21) Appl. No.: 13/312,258

(22) Filed: Dec. 6, 2011

(65) Prior Publication Data

US 2013/0143193 A1     Jun. 6, 2013

(51) Int. Cl.
*G09B 25/00*     (2006.01)

(52) U.S. Cl.
USPC .......................................................... 434/365

(58) Field of Classification Search
CPC .. G06T 7/004; A61F 13/84; A61F 2013/8479
USPC ................................... 434/365; 382/128, 141
See application file for complete search history.

(56) References Cited

U.S. PATENT DOCUMENTS

| | | | |
|---|---|---|---|
| 3,911,173 A | 10/1975 | Sprague, Jr. | |
| 3,929,135 A | 12/1975 | Thompson | |
| 4,324,246 A | 4/1982 | Mullane et al. | |
| 4,342,314 A | 8/1982 | Radel et al. | |
| 4,463,045 A | 7/1984 | Ahr et al. | |
| 4,573,986 A | 3/1986 | Minetola | |
| 4,785,996 A | 11/1988 | Ziecker et al. | |
| 4,842,666 A | 6/1989 | Werenicz | |
| 5,006,394 A | 4/1991 | Baird | |
| 2002/0198518 A1* | 12/2002 | Mikus et al. | 606/21 |
| 2012/0314042 A1* | 12/2012 | Agami et al. | 348/61 |

* cited by examiner

*Primary Examiner* — Xuan Thai
*Assistant Examiner* — Jerry-Daryl Fletcher
(74) *Attorney, Agent, or Firm* — Andres E. Velarde

(57) ABSTRACT

A method for placing an absorbent article is provided. The method includes placing an absorbent article in an undergarment in a manner understood by the individual prior to wearing, capturing a still or video image of the absorbent article on the undergarment, and submitting the still or video image of the absorbent article. The consumer then receives output regarding the placement of the absorbent article.

20 Claims, 6 Drawing Sheets

METHOD OF PLACING AND ABSORBENT ARTICLE

FIELD OF INVENTION

The present invention is directed to methods of applying an absorbent article in an undergarment, and more specifically, to methods of placing an absorbent article with confirmation or output using computing devices and mobile computing devices.

BACKGROUND OF THE INVENTION

Consumer goods companies aim to teach consumers how to use the individual product so that consumers experience the intended benefit. However, it is impossible for companies to be there with the consumers as they use the actual product. Through attempts at improving the product, companies know that consumers do not always use the product appropriately or in the manner intended by the manufacturer. Consumers have no way of confirming proper placement of the absorbent article with the manufacturer. Further, many consumers may never realize that the placement is improper. This is partially because women all have different levels of overall menstrual flow throughout their cycle and have different absorbent article needs. Often, a woman's menstrual cycle is typically characterized by initial light flow which subsequently increases and finally tapers off to the end of the period. Improper use or placement may not significantly impact one consumer's experience while another consumer may see a significant impact due to improper placement. However, there is no way to determine if an absorbent article is used appropriately in the privacy of the user's home. Further, there is no way for the consumer to verify proper placement at the time of placement with the manufacturer.

Consequently, the need remains for a method of placing the absorbent article that allows the consumer to receive information regarding the actual proper placement of the absorbent article. In addition, the need remains for a method that allows the consumer to receive the information in real time. Furthermore, there remains a need for allowing the individual to send an image of their attempted proper placement and receive validation and/or correction.

SUMMARY OF THE INVENTION

A method for placing an absorbent article in an undergarment is provided. The method includes placing an absorbent article in an undergarment, capturing a still or video image of the absorbent article on the undergarment, and submitting the still or video image of the absorbent article. The consumer then receives output regarding the placement of the absorbent article; and may correct the placement of the absorbent article in accordance with the output.

A method for placing an absorbent article in an undergarment is provided. The method includes submitting information about the absorbent article and undergarment to an absorbent article application on a computing device. The consumer then receives output from the computing device regarding the placement of the absorbent article in the undergarment and places the absorbent article in the undergarment in accordance with the output.

BRIEF DESCRIPTION OF THE DRAWINGS

While the specification concludes with claims particularly pointing out and distinctly claiming the subject matter of the present invention, it is believed that the invention can be more readily understood from the following description taken in connection with the accompanying drawings, in which:

DETAILED DESCRIPTION OF THE INVENTION

Figure 1:
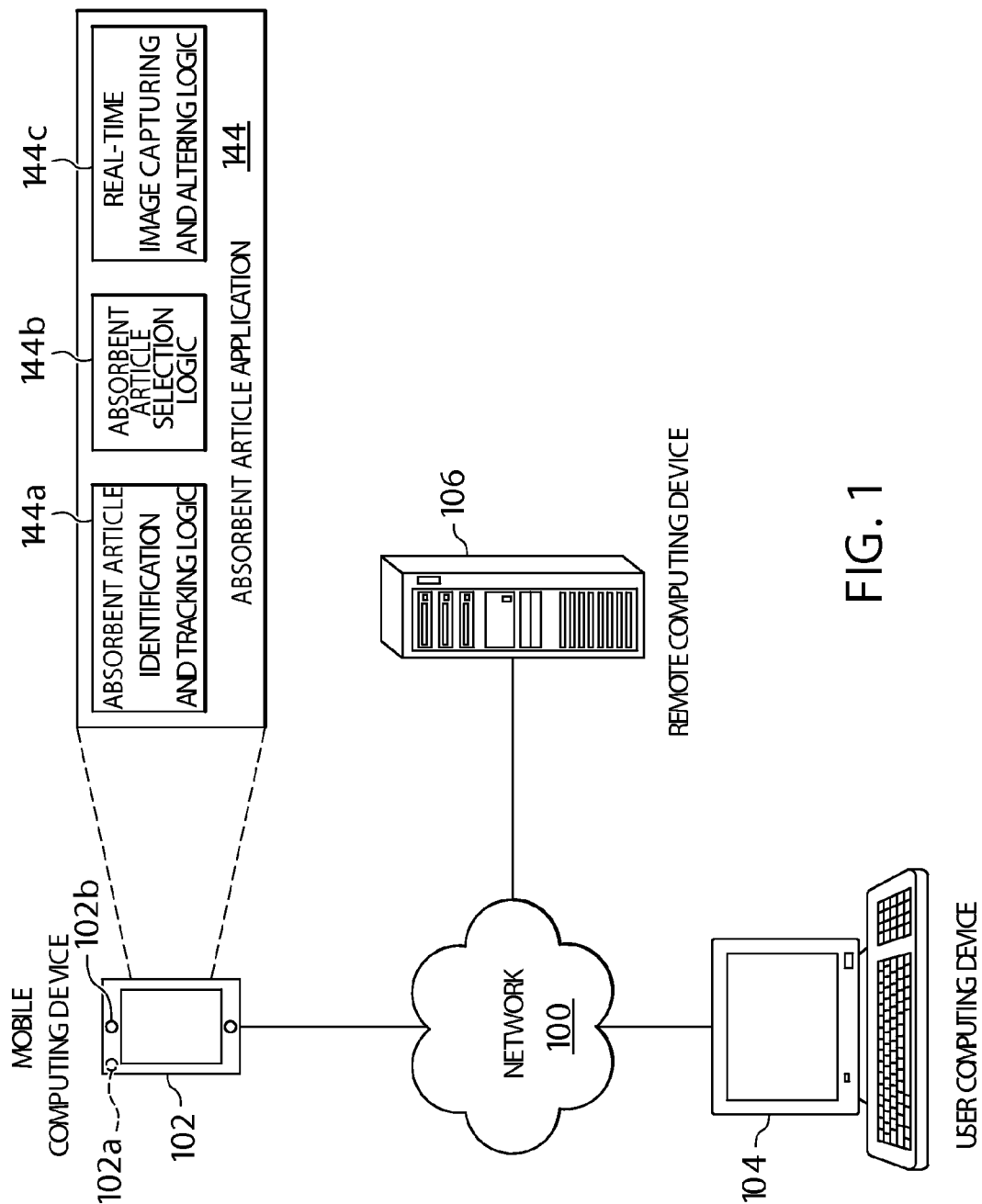
FIG. 1 depicts a computing environment, illustrating a system for data collection.

The present invention is directed to a system and methods for the placement of an absorbent article that can provide information and validation of proper product placement and usage, including for example, during use of the absorbent article. A consumer using an absorbent article typically unwraps the absorbent article and applies the article to an undergarment in what the consumer believes is the most effective placement. This placement may be based on package graphics and/or prior experience with the product, for example, if the consumer experiences a failure, the consumer may adjust product placement the next time. As such, a consumer attempting to properly place the absorbent article has no way of receiving confirmation that the placement is correct until the product either fails or is effective during use. The present invention, on the other hand, allows for consumers to receive training and feedback on article placement, such as, for example, at the time of placement. For example, the method allows for the consumer to place the absorbent article, capture still or video image data of the placement, submit the still or video image data, and receive validation that they are using the product appropriately, or alternatively receive suggested correction on placement to improve product effectiveness. Further, the method allows for the manufacturer or a related party to aid the consumer in the placement process of the individual absorbent article accounting for other factors such as, for example, the day in her cycle for the consumer, prior usage history, and prior usage experiences. In some examples, the method can include the collection of information including, for example, certain characteristics of the consumer's menstrual cycle and/or the absorbent articles, both before and after use. The information collected along with the still or video image captured can be used to make correlations between the data and the information to develop future absorbent articles, to provide product selection recommendations, and/or to create tutorials on proper product placement.

The following text sets forth a broad description of numerous different examples of the present disclosure. The description is to be construed as exemplary only and does not describe every possible combination of elements since describing every possible combination of elements would be impractical, if not impossible. It can be understood that any feature, characteristic, component, composition, ingredient, absorbent article, step or methodology described herein can be deleted, combined with or substituted for, in whole or part, any other feature, characteristic, component, composition, ingredient, absorbent article, step or methodology described herein. Numerous alternative combinations could be implemented, using either current technology or technology developed after the filing date of this patent, which would still fall within the scope of the claims.

More specifically, examples disclosed herein may be configured as a system, mobile computing device, method, and/or non-transitory computer-readable medium for identifying an absorbent article from a real-time still or video image. More specifically, in some examples, the user may direct an image capturing device, such as a camera, at an absorbent article. The image capturing device may be configured to capture a real-time still or video image of the absorbent article.

The image capturing device may also be physically and/or communicatively coupled to a mobile computing device and a display device. The mobile computing device may include a memory that stores a computer application that guides a user through the data output, image capturing, and submission process. The computer application on the mobile computing device may contain information that is used for output to the consumer after the submission process. Alternatively, the submission may be to a remote server. Additionally, the user can indicate to the mobile computing device a keyword or other indicator related to the absorbent article during the submission process. The keyword may serve as a common identifier for the absorbent article given to all users to help interpret the submission data.

Additionally, the computer application may cause the mobile computing device to alter the real-time still or video image. As described herein, alterations of the real-time still or video image may include highlighting the absorbent article, such as creating a virtual outline around the absorbent article, creating a computer graphics interface (CGI) overlay, "graying out" background, manipulating or highlighting the background, and tagging areas of the absorbent article image with virtual objects such as, for example, an arrow, line, and/or circle. Additionally, the mobile computing device may be configured with network capabilities (e.g., to transfer absorbent article information and data to a server, etc.).

It should be understood that by graying out a background surrounding the absorbent article, the mobile computing device may utilize any visual means to de-emphasize the non-desired area. This could include converting the non-selected area to a grey-scale image, fuzzing or de-focusing the area, and putting a partial transmission mask over the area. Other mechanisms for de-emphasis are also included within the scope this disclosure.

As used herein, the term "comprising" means that the various components, ingredients, or steps, can be conjointly employed in practicing the present invention. Accordingly, the term "comprising" encompasses the more restrictive terms "consisting essentially of" and "consisting of:" Other terms may be defined as they are discussed in greater detail below.

As used herein, the term "computing device" refers to a system comprising an input device, a processor, at least one memory, and at least one output device coupled together via electrical circuitry or other suitable coupling means. Optionally, a network interface is also provided, for connecting a first computing device to a communications network.

Herein, the term "absorbent articles" refers to articles which absorb and contain body fluids or exudates, and more specifically, refers to articles which are placed against or in proximity to the body of the wearer to absorb and contain the various exudates discharged from the body. The term "disposable" is used herein to describe absorbent articles which are not intended to be laundered or otherwise restored or reused as an absorbent article (i.e., they are intended to be discarded after a single use, and preferably, to be disposed of in an environmentally compatible manner). Typical disposable feminine hygiene absorbent articles according to the present invention are sanitary napkins, panty liners, tampons, absorbent articles for adult incontinence or the like. Feminine hygiene articles do not include baby diapers.

Herein, the term "feminine hygiene absorbent article" is used in a broad sense including any article able to receive and/or absorb and/or contain and/or retain body fluids/bodily exudates such as menses, vaginal secretions, and urine. Exemplary feminine hygiene absorbent articles include disposable feminine hygiene absorbent articles. Such articles include tampons, sanitary napkins, interlabial products, incontinence devices, and pantiliners.

As used herein, the term "image capturing device" refers to a device capable of capturing a still or video image. Such image capturing devices include digital cameras, webcams, mobile phones, and tablets with image capturing software. The image capturing device may be physically and/or communicatively coupled to a mobile computing device and a display device.

As used herein, the term "input device" refers to a device used to interact with a computing device, for example, a computer mouse, electronic stylus (or "pen"), touch screen, keyboard, keypad, microphone/voice recognition system, scanner, or other suitable apparatus for entering information in electronic form known in the art. The input/output hardware may include and/or be configured to interface with a monitor, positioning system, keyboard, mouse, printer, image capturing device, microphone, speaker, gyroscope, compass, and/or other device for receiving, sending, and/or presenting data.

As used herein, the term "memory" refers to a volatile or non-volatile storage media, such as ROM, SRAM, DRAM, and/or other types of RAM, flash memory, secure digital (SD) memory, registers, compact discs (CD), digital versatile discs (DVD), and/or other types of non-transitory computer-readable mediums. As is well known in the art, memory may include a plurality of distributed memory coupled via electrical circuitry. These non-transitory computer-readable mediums may reside within the mobile computing device and/or external to the mobile computing device. Additionally, the memory component may be configured to store operating logic and an absorbent article application. The absorbent article application may include a plurality of different pieces of logic including the absorbent article identification logic, the absorbent article selection logic, and the real-time still or video image capturing and altering logic, each of which may be embodied as a computer program, firmware, and/or hardware, as an example.

As used herein, the term "mobile computing device" may include a mobile telephone, personal digital assistant, laptop computer, tablet, and/or other mobile device. A mobile computing device may have a memory that stores a computer application that causes the mobile computing device to prompt the individual to capture a real time image of the absorbent article.

As used herein, the term "output device" refers to a computer monitor, LCD display, flat-screen display (for example, gas-plasma, activematrix or LED display), or similar device (including a display of a personal digital assistant or other handheld or portable device) suitable for display of visual information, and/or a speaker or other suitable device for outputting audio information, as known in the art.

As used herein, the term "photo alignment indicia" relates to a reference used to center the absorbent article in the still or video image created by the image capturing device. The photo alignment indicia may be cross hairs, a virtual boundary, the boundary of the still or video image itself, or a size closeness guide.

As used herein, the term "processor" relates to one or more suitable microprocessors well known in the art, which processes data and computing instructions received via output device or stored in memory. Processor executes computing instruction to perform processes such as those described below in accordance with the present invention. The processor may include any processing component operable to receive and execute instructions (such as from the data storage component and/or memory component). The input/output hardware may include and/or be configured to interface with a monitor, positioning system, keyboard, mouse, printer, image capturing device, microphone, speaker, gyroscope, compass, and/or other device for receiving, sending, and/or presenting data.

Referring now to the drawings, FIG. 1 depicts a computing environment, illustrating a system for data submission, according to examples shown and discussed herein. As illustrated in FIG. 1, a network 100 may include a wide area network, such as the Internet, a local area network (LAN), a mobile communications network, a public service telephone network (PSTN) and/or other network and may be configured to electronically couple a mobile computing device 102, a user computing device 104, and a remote computing device 106.

The mobile computing device 102 may include and/or be coupled to a first image capturing device 102(a) and a second image capturing device 102(b). The first image capturing device 102(a) may be positioned on a back side of the mobile computing device 102 (as indicated by the dashed circle) and may be configured to capture real-time video images, still images, and/or other images. Similarly, the second image capturing device 102(b) may be positioned opposite the first image capturing device 102(a) and may also be configured to capture still images, real-time video images, and/or other imagery. Further, it should be understood that, while the example of FIG. 1 illustrates the image capturing devices 102(a), 102(b) as being physically part of the mobile computing device 102, some examples may be configured such that the first image capturing device 102(a) and/or the second image capturing device 102(b) reside external to the mobile computing device 102. In such a combination of elements, the image capturing devices 102(a), 102(b) may communicate image data to the mobile computing device 102 via a wired and/or wireless protocol. Similarly, while the mobile computing device 102 of FIG. 1 may be illustrated with an attached display, this is also merely an example. In some combination of elements, the display may reside external to the mobile computing device 102 and may communicate with the mobile computing device 102 via a wired or wireless protocol. In some combination of elements, the mobile computing device 102 may have both image capturing devices 102(a) and 102(b) positioned on the same side of the mobile computing device 102. The placement of both image capturing devices 102(a) and 102(b) on the same side may allow for stereoscopic image still or video capturing, commonly known as 3D images or video.

Also included in the mobile computing device 102 is an absorbent article application 144, which includes absorbent article identification and tracking logic 144(a), absorbent article selection logic 144(b), and real time image capturing and altering logic 144(c). The absorbent article identification and tracking logic 144(a) may be configured to track the location of the identified absorbent article within the image, regardless of movement of the absorbent article or the mobile computing device 102. Additionally, the absorbent article identification and tracking logic 144(a) may be used to track an outline of an absorbent article relative to an underwear or undergarment and may determine the appropriate placement of the absorbent article on the underwear or undergarment. The absorbent article tracking and identification logic 144(a) may recognize the appropriate undergarment for proper placement. Alternatively, the absorbent article tracking and identification logic 144(a) may request that the individual user input the appropriate undergarment. The absorbent article tracking and identification logic 144(a) may determine the proper placement of the absorbent article on the undergarment using inputs given by the consumer such as the type of undergarment and the manufacturer and product name of the absorbent article. The absorbent article tracking and identification logic 144(a) may also account for other inputs such as the day in the consumers' menstrual cycle, previous data related to stain location on pad, previous pad in panty placement data, total area of pad that was stained, stain pattern, soiling of the undergarment, pad change frequency, and level of current or historical menstrual flow to determine the proper placement of the absorbent article. Similarly, the real-time video capturing and altering logic 144(b) may be configured to render a real-time still or video image for display, as well as alter the imagery, as described in more detail below.

Additionally, while the mobile computing device 102 is illustrated with the absorbent article selection logic 144(b), and the real-time still or video image capturing and altering logic 144(c), within the absorbent article application, this is also an example. More specifically, in some examples, a single piece of logic may perform the described functionality. Similarly, in some examples, this functionality may be distributed to a plurality of different pieces of logic, which may reside in the mobile computing device 102 and/or elsewhere. Additionally, while only one application is illustrated as being stored by the memory component, other applications may also be stored in the memory component and utilized by the mobile computing device 102.

Also illustrated in FIG. 1 is the user computing device 104. More specifically, the user computing device 104 may be configured to communicate with the mobile computing device 102 via a wireless network 100 or through a wired connection. The user computing device 104 may also be connected to an image capturing device 102(a) via the network or through a wired connection. In some examples, the mobile computing device 102 may send stored data to the user computing device 104 for backup. This data may be sent to the mobile computing device 102 to enhance accuracy of determinations made by the mobile computing device 102 and access remotely stored user profile information. Data sent to a user computing device 104 may be password protected.

Similarly, the remote computing device 106 may also be coupled to the network 100 and may be configured to communicate with the mobile computing device 102 (and/or with the user computing device 104) to receive data submissions and to upload data to the mobile computing device 102 application or to further enhance performance of the mobile computing device 102.

The network 100 interface hardware may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the mobile computing device 102 and other computing devices.

It should be understood that while the mobile computing device 102, the user computing device 104, and the remote computing device 106 are depicted as PDAs, personal computers and/or servers, these are merely examples. More specifically, in some combination of elements any type of computing device (e.g. mobile computing device 102, personal computer, server, etc.) may be utilized for any of these components. Additionally, while each of these computing devices is illustrated in FIG. 1 as a single piece of hardware, this is also an example. More specifically, each of the computing devices—may represent a plurality of computers, servers, databases, etc.

The activities which might take place in establishing a connection between a mobile computing device 102 and a server may include steps like setting up a connection setting with the server. If this is the first time the user has established a connection from the mobile computing device 102, then these connection settings can be inputted (e.g., entering a unique user name and password of the individual user of the mobile computing device 102, as well as network address for the server). Alternatively, if the user has already used the mobile computing device 102, and has saved connection settings previously, these settings could be loaded and used rather than having to be separately input. A password may be requested each time regardless of prior submissions for the sake of security.

The remote computing device 106 may be a "server" computer such as a microcomputer or personal computer, or, depending on the volume of surveys to be created and/or survey data to be collected, a computer with greater storage and/or processing capacity, such as a minicomputer or mainframe. The remote computing device 106 or server may be secured using known security software to ensure confidentiality and security of the data submitted by consumers. One or more remote computing devices 106 are used by an individual to create customized surveys that are sent to the individuals using the test absorbent article. Once a survey is created, it is transferred or uploaded to the first computing device via network.

Once the connection with the server has been established, the user can use the mobile computing device 102 to determine data for submission, such as by filling out a form with appropriate metadata, and adding media to that form. Once the form has been filled out and the media captured, the application on the mobile device can validate the form data, such as by verifying that any media elements to be submitted are properly identified. The data could then be packaged into the proper format (e.g., mapped into a data structure having fields corresponding to columns in a table in the database), and added to a submission queue.

Finally, when the submission is uploaded, the submission remnants can be removed from the mobile computing device 102 and the server. Specifically, once the upload is complete and confirmed, the mobile device could send the server a delete submission request. The mobile device and the server could then remove the data, thereby leaving the database or remote computing system as storing the master copy of the submitted information, and freeing up the resources of the server and mobile devices. This may help ensure confidentiality by removing still and video image data from the mobile computing device 102.

After data has been submitted, the mobile computing device 102 may receive information from the remote computing device 106. The information may be in the form of still images or video images or words related to the proper placement of the absorbent article in the undergarment. Alternatively, the information from the remote computing device 106 may be in the form of text congratulating the consumer on the proper placement of the absorbent article.

Figure 2:
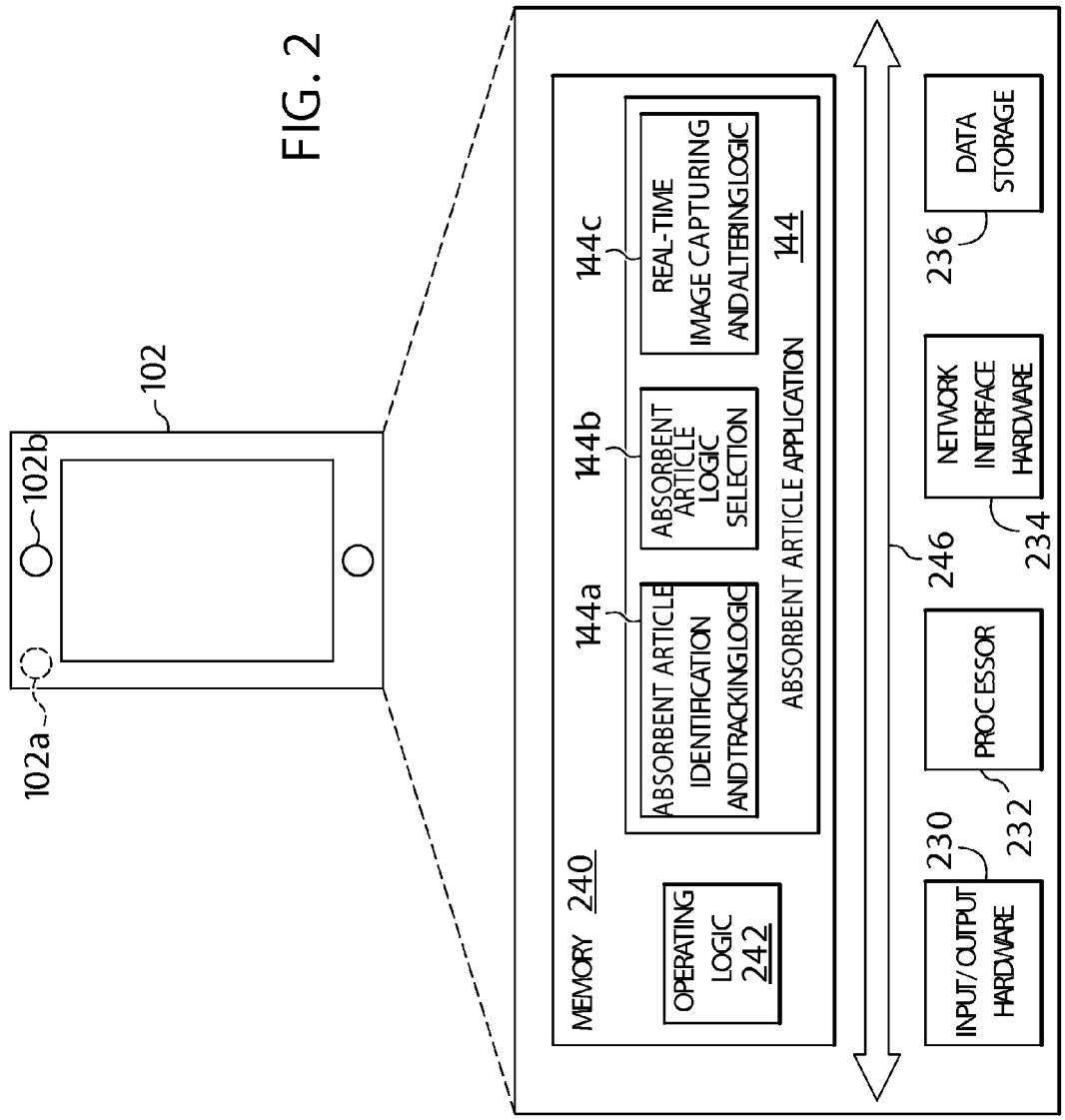
FIG. 2 depicts a mobile computing device, which may be utilized in the computing environment of FIG. 1.

FIG. 2 shows a mobile computer device that may be utilized in the computing environment of FIG. 1. In the illustrated example, the mobile computing device 102 includes a processor 232, input/output hardware 230, network interface hardware 234, a data storage component 236 (which stores the user data, absorbent article data, and/or other data), and a memory component 240. Additionally, the memory component 240 may be configured to store operating logic 242 and an absorbent article application 144. The processor 232 may also include and/or be coupled to a graphical processing unit (GPU).

The absorbent article application 144 may cause the mobile computing device 102 to alter the real-time still or video image to provide information related to the absorbent article. As described herein, alterations of the real-time still or video image may include highlighting the absorbent article, such as creating a virtual outline or virtual frame around the absorbent article, creating a computer graphics interface (CGI) overlay, "graying out" background, tagging the absorbent article or portions of the absorbent article image with one or more virtual objects such as, for example, an arrow, line, and/or circle. The absorbent article application 144 may also provide for different image capturing options such as, for example, zoom, black and white or grayscale effects, negative effects, sepia effects, any other effect used to impact the visual image captured by the image capturing device 102(*a*). The absorbent article application 144 may also virtually add information supplied to by the individual to the image or video captured by the image capturing device 102(*a*). Information added may include, for example, a date stamp, an identification number for the individual, an identification number for the absorbent article, or any other information that may be helpful. Additionally, the mobile computing device 102 may be configured with network capabilities (e.g., to upload still or video image data of an absorbent article, etc.).

Specifically, combination of elements disclosed herein may be configured as a system, mobile computing device 102, method, and/or non-transitory computer-readable medium for identifying an absorbent article from a real-time still or video image, as well as providing an altered version of the real-time still or video image. More specifically, the user may direct an image capturing device, such as a camera at an absorbent article. The image capturing device may be configured to capture a real-time still or video image of the absorbent article.

The mobile computing device 102 may prompt the individual to submit information. Input information collected from the consumer may be in response to questions in the form of a survey. The consumer's response to these questions may then be used to determine areas of improvement in the placement of the absorbent articles and correlations between absorbent article characteristics and the placement accounting for styles of undergarments. Consumers may be asked to submit surveys both prior and after using the product. Similarly, a survey request may occur at certain times while using the product. For example, a survey request may require submission of surveys every 3 hours for up to 12 hours. Alternatively, a survey request may request submission within a fixed time after the consumer considers the absorbent article stained. A survey request may also occur in response to the submission of video or image data by the consumer. Questions asked may be focused on, for example, description of menstrual flow, perceived flow on the heaviest flow day, length of time absorbent article was used, comfort and fit of absorbent article, perceived leakage, unintentional urine loss, location of fluid on the absorbent article or undergarment, depth of fluid on the absorbent article, stain size, or any other suitable questions. Furthermore, these questions may be asked of the consumer in any suitable fashion, for example, via the mobile computing device 102, the World Wide Web, or a paper survey. Questions may also request the consumer's age, consumer's absorbent article preference, consumer's prior absorbent article use, what other feminine hygiene products the consumer has used or is currently using, consumer's description of her flow on her heaviest day of her period, how many absorbent articles in total does the consumer use in her period, time between changing absorbent articles on the consumer's heaviest day, any leaks while using an absorbent article on the consumer's heaviest day, what is the consumer's confidence that when the absorbent article is changed during the heaviest time that the absorbent article has been fully used, what is the level of confidence the consumer has regarding the absorbent article and her interaction with the absorbent article, and the consumer's impression of future concepts and ideas. Questions may also request information related to what types of undergarments the consumer uses, how often the consumer uses a particular type of undergarments, or how a consumer places the absorbent article in the undergarment. The submission of informational and still or video image data may prompt a new survey in response to the data supplied.

The questions may be used to determine categories that may be identified as profile, segment, and/or classification. This separation into profile, segment, and/or classification may be produced in any suitable fashion, including but not limited to, questions asked of consumers, such as questions about habits, traits, personality, and/or responses to visual situations and/or images of the consumers. The profile, segment, and/or classification into which a particular consumer belongs to may be similarly performed. These questions, for example, may be based on habits, traits, personality, and/or responses to visual situations and/or images of the consumers. One system of question asking to classify consumers into profile, segment, and/or classification is psychographic segmentation.

Any suitable combination of either individual questions or groups of questions may be asked in order to collect sufficient information to provide the basis for developing correlations used to improve absorbent articles. The precise manner and wording chosen to collect this information from the consumer may vary depending on local custom, the comfort level consumers in a particular area may have in describing their menstrual flow characteristics, and the shades of meaning associated with terms which may be used in different parts of the world to collect the information desired.

In accordance with an example of the present invention, the mobile computing device 102 memory component 240 and data storage component 236 stores all the information related to the absorbent article application 144. Analysis by the absorbent article application 144 is done by the mobile computing device 102 without the need to have a connection to a remote computing device 106.

In accordance with yet another example of the present invention, a computer program product operates a remote computing device 106 to analyze the information submitted by various consumers to make correlations; for example, to determine if particular products are improperly placed more regularly. The results of these studies can be used in a variety of ways to make correlations between visual images provided by the individuals and the absorbent articles thereby improving future absorbent articles.

Data collected by a computing device is eventually transferred to a remote computing device 106, where it is stored in memory 240. Suitable encryption algorithms known in the art or other suitable methods of encryption also can be used to protect the confidentiality of personally-identifiable information, such as first name, last name, and address, or other sensitive information.

Data may be stored in one or more databases or data warehouses in memory 240. The data storage component 236 may reside local to and/or remote from the mobile computing device 102 and may be configured to store one or more pieces of data for access by the mobile computing device 102 and/or other components. Generally, a database is an organized body of information, such as a collection of data arranged for search and retrieval, and may include structured tables or records, multiple computer files, or a single file. In the illustrated example, a relational database product such as SQLServer, Oracle, or Access can be used, although any other suitable means for storing and retrieving data also may be used.

It should be understood that the components illustrated in FIG. 2 are merely exemplary and are not intended to limit the scope of this disclosure. While the components in FIG. 2 are illustrated as residing within the mobile computing device 102, this is merely an example. In some combination of elements, one or more of the components may reside external to the mobile computing device 102. In addition, while the mobile computing device 102 in FIGS. 1 and 2 is illustrated as a single device, this is also merely an example. In some combination of elements, the absorbent article identification and tracking functionality, the absorbent article selection functionality, and the real-time still or video image capturing and altering functionality may reside on different devices.

Figure 3:
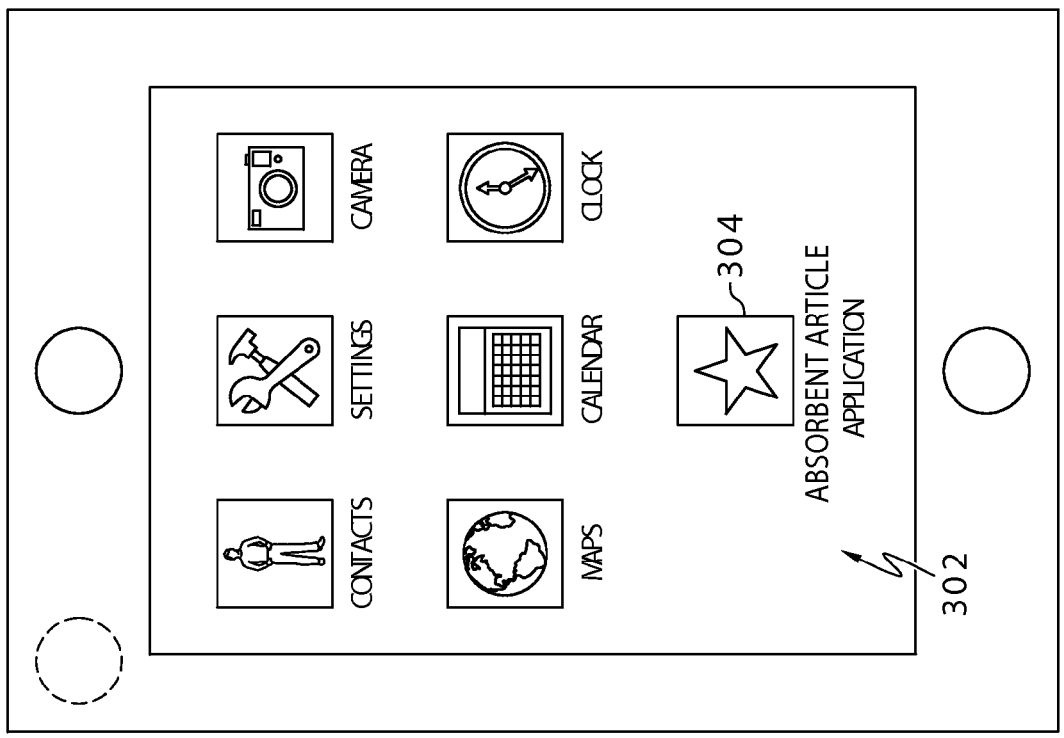
FIG. 3 depicts an interface for accessing a computer application for absorbent article identification.

FIG. 3 depicts an interface for accessing the absorbent article application 304 for absorbent article identification, according to examples shown and described herein. As illustrated, the mobile computing device 102 is configured to provide an interface (e.g., via the operating system). The interface 302 may be configured to provide the user with access to one or more computer applications 304 that are stored on the mobile computing device 102 and/or elsewhere. As illustrated, the mobile computing device 102 may include and provide options to access a contacts application, a settings application, a camera application, a maps application, a calendar application a clock application, and an absorbent article application. As illustrated, the absorbent article application may be accessed by selection of the absorbent article application option. Other applications may also be provided.

The absorbent article application 304 may be configured to maintain a private calendar used by the consumer to track their menstrual cycle. The absorbent article application 304 may be configured to use the information from the calendar such as, for example, date of menstrual cycle, flow levels, or other prior information submitted by the consumer. The absorbent article application 304 may also be configured to use the information from the calendar to recommend proper product placement and product recommendations.

It should be understood that the consumer may access the absorbent article application 304 at different points while placing the absorbent article. The consumer may access the absorbent article application 304 after placing the absorbent article in an undergarment in the manner understood by the individual prior to wearing. This allows the consumer to then capture the still or video image of the absorbent article on the undergarment. After submitting the still or video image of the absorbent article to the absorbent article application 304, the consumer can receive output regarding the placement of the absorbent article. Alternatively, the consumer may submit the still or video image to a remote computer 106 to receive output regarding the placement of the absorbent article. The consumer may then correct the placement and capture another still or video image for submission. If the placement is correct, the consumer can receive an image or text congratulating her on the proper placement of the absorbent article.

The consumer may also access the absorbent article application 304 prior to placing the absorbent article in the undergarment. The consumer may take a still or video image of the absorbent article and the undergarment separately and submit the still or video images. Similarly, the consumer may choose to submit the information using a drop down menu giving a list of options for absorbent articles and undergarments instead of submitting still or video images. The consumer may then receive output regarding the appropriate placement of the absorbent article in the undergarment from the absorbent article application 304. The output may be provided from the memory of the remote computing device or from a remote server 106. The output may be in the form of an instructional video or in the form of still images with and without instructions. The instructional video or still images may cover opening the absorbent article, unwrapping the absorbent article, proper holding of the absorbent article, proper placement of the absorbent article in relation to the body and in relation to the undergarment and proper disposal procedure after usage of the absorbent article. The output may be based on the use of print signals on the absorbent article to properly place the absorbent article, the use of physical aspects of the absorbent article, such as, for example, the center of a wing, to place the article, and/or the use of a relationship between print signal on the absorbent article and the physical characteristics of the absorbent article to place the absorbent article.

It should be understood that while the mobile computing device 102 from FIG. 2 only illustrates the absorbent article application 304, this is merely an example. More specifically, as discussed above, the absorbent article application 304 may provide additional functionality, such as that provided by the computer applications of FIG. 3. Additionally, while the mobile computing device 102 depicted in FIG. 2 illustrates a single absorbent article application 304, other computer applications may also reside in the memory component 240.

Figure 4:
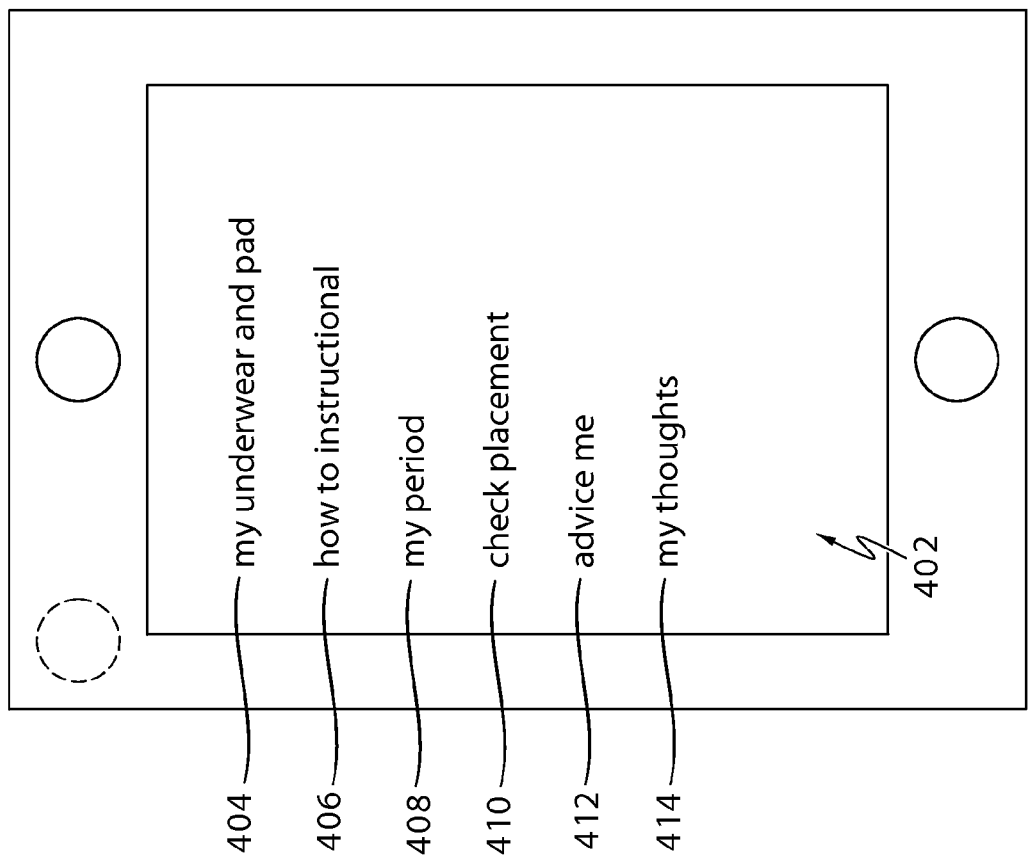
FIG. 4 depicts an interface for providing a plurality of user options related to the article application.

FIG. 4 depicts an interface 402 for providing a plurality of user options related to the absorbent article application 304, according to embodiments shown and described herein. As illustrated, the interface 402 may provide various options including: "my underwear and pad" 404, "how to instructional" 406, "my period" 408, "check placement" 410, "advise me" 412, and "my thoughts" 414.

By selecting "my underwear and pad" 404, the consumer is allowed to submit information about their undergarment and/or the absorbent article. The information may be submitted in the form of a still or video image or by using a drop down menu. The consumer may also choose from previously used images or selections that are saved in the memory 240 of the absorbent article application 304 on the mobile computing device. After submission, output as to proper placement is given to the consumer based on prior submissions or data gathered by the application. If the submission cannot be properly analyzed by the absorbent article application 304, the application may request a new submission.

By selecting the "how to instructional" 406, the consumer is given a list of options describing the placement of different absorbent articles on different undergarments. The consumer may choose the option desired to watch a video on proper placement or to open a document with instructions.

By selecting "check placement" 408, the absorbent article program 304 opens a camera function allowing the consumer to take a still or video image of the current placement of the absorbent article. The consumer may then submit the still or video image to receive output from the application regarding the placement of the absorbent article. The "check placement" function may also include a virtual frame as part of the output allowing the consumer to line up the virtual frame with the undergarment and the absorbent article to determine the appropriate location for the absorbent article. The absorbent article application 304 may use the prior submission data to tailor the virtual frame.

By selecting "advise me" 410, the application considers prior historical data to recommend a product or direct the consumer to websites that may answer their questions. The "advise me" option may ask questions relating to the consumer's personal experiences to make a recommendation. In an alternative, the "advise me" may also supply the consumer with coupons for products and recommendations on where the products may be purchased.

By selecting "my thoughts" 412, the consumer may give feedback to the absorbent article application 304 regarding how the application may improve. The feedback may be in the form of a questionnaire or in the form of text.

By selecting "my period" 414, the consumer is given a list of options that may include submitting data regarding when the period began or ended, the level of flow on any particular day, and any leak incidents. The consumer may also choose to receive advise from the absorbent article application 304 regarding the consumer's period. Advise or suggestions can be tailored in response to the data submitted by the consumer under "my period". This may focus on product recommendations or placement changes for different portions her cycle. The absorbent article application may request a still or video image of the used absorbent article to analyze stain or leakage. Additionally, fluid stain patterns on the absorbent article may also be analyzed to determine proper placement of the absorbent article. This analysis may be used to give advise or suggestions in response to leak incidents.

It should be understood that while the interface 402 from FIG. 4 only illustrates a limited number of options in a particular format, this is merely an example. More specifically, the absorbent article application 304 menu may be presented in various formats, with various configurations and options, and colors. The absorbent article application 304 menu may also be integrated with other applications such as the calendar function of the mobile computing device or other applications used to track a menstrual calendar. The absorbent article application 304 may be integrated with the clock function and may remind the consumer to change the absorbent article based on prior submitted data such as, for example, prior flow data, stain data, and/or "activity" data. The absorbent article application 304 may also contain a private calendar that tracks product usage and information submitted by the consumer. The private calendar may be password protected.

Figure 5:
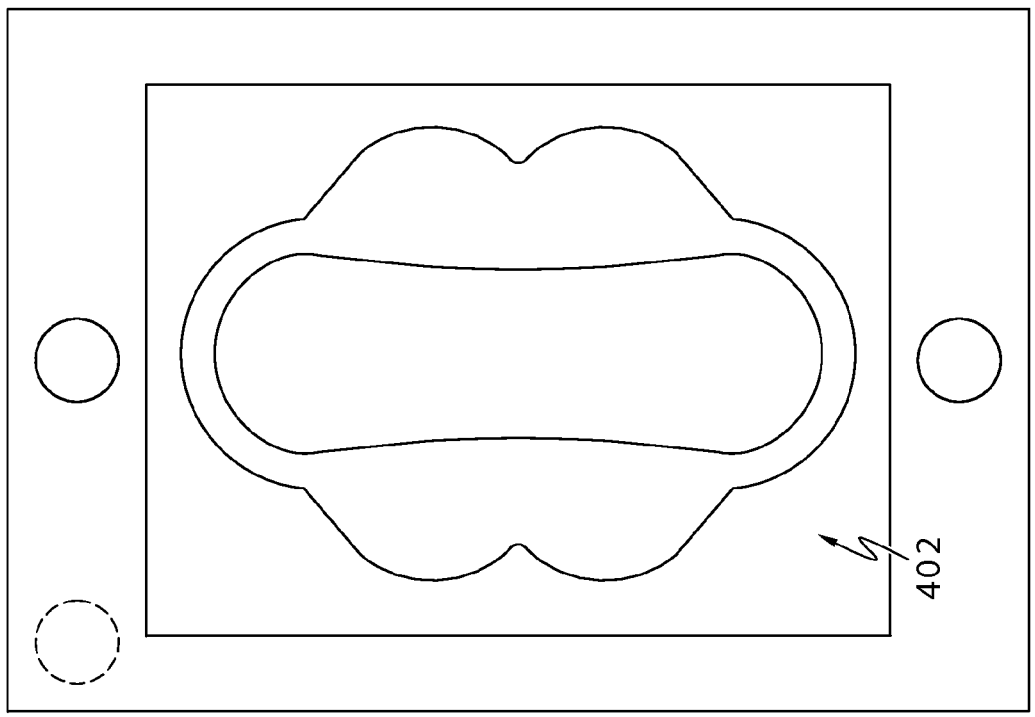
FIG. 5 depicts an interface of a real-time still or video image of an absorbent article.

FIG. 5 depicts an interface of a real-time still or video image of how a still or video image of the absorbent article may appear on the mobile computing device 102, according to examples shown and described herein. As illustrated, in response to submitting the requested information, the mobile computing device 102 may be configured to receive, from the first image capturing device 102(a) real-time still or video image. The user may direct the first image capturing device 102(a) to an absorbent article.

An individual may choose to capture the still or video image in any method or environment they see fit. Using the method described herein allows the user to capture a still or video image in the privacy of their home or any other suitable place. The capturing of a real time image of the absorbent article allows the user to submit the requested still or video image and information relating to the absorbent article use to the absorbent article application 144 for analysis. This allows the consumer to confirm proper placement of the absorbent article in real time or to request analysis of their absorbent article and absorbent article use for analysis after use to determine cause for leakage. Suitable environments may include, for example, a public or private bathroom or any other suitable environment.

To capture a still or video image of the absorbent article, an individual can place the absorbent article in front of the image capturing device with our without the undergarment. The absorbent article may be soiled or used and be submitted for analysis or alternatively may be clean or new and submitted to determine proper placement. Alternatively, the absorbent article may be placed in the undergarment in the manner understood by the individual prior to wearing. The individual would then initiate the appropriate application or turn on the image capturing device. To place the absorbent article in front of the image capturing device, the individual may choose to remove their undergarment and absorbent article or simply pull down the undergarment containing the absorbent article without removing the undergarment and moving the image capturing device so that the absorbent article is in front of the image capturing device. If photo alignment indicia are provided, the absorbent article can be centered using the photo alignment indicia. The still or video image may be captured and prepared to be submitted to the absorbent article application 144 or uploaded to the remote computer 106 via a computing device.

Figure 6:
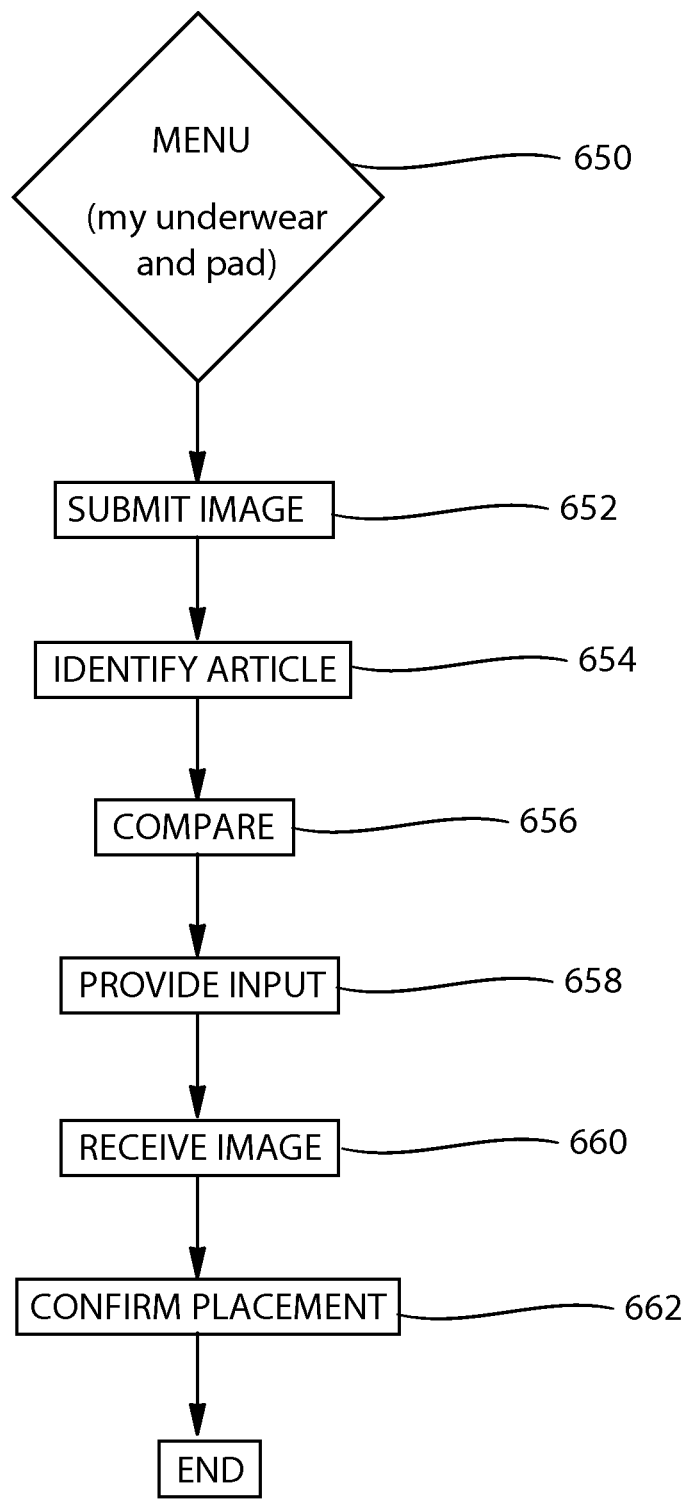
FIG. 6 depicts an interface of an absorbent article placement using the virtual frame.

FIG. 6 depicts a flowchart for proper placement of the absorbent article, according to one example of the invention. As illustrated in block 650, a user may determine the activity they want to perform in the absorbent article application 144 from a menu. In response to a determination that the consumer wants to verify the proper placement of the absorbent article in the undergarment, the consumer may select "my underwear and pad". At block 652, the absorbent article and undergarment image may be submitted to the absorbent article application 144. Upon submission, the absorbent article application 144 may request a new submission if the current submission cannot be analyzed. At block 654, the absorbent article application 144 logic may identify the absorbent article and undergarment. At block 656, the absorbent article application 144 may compare the undergarment and absorbent article to prior submissions to tailor the output given to the consumer. At block 658, the absorbent article application 144 logic may give output to the consumer regarding the proper placement of the absorbent article accounting for prior submissions by the consumer regarding their menstrual cycle including a virtual frame. At block 660, the absorbent article application 144 may receive a second submission of data from the consumer. The absorbent article application 144 may request a new submission if the absorbent article application 144 determines that the submission may not be properly analyzed. At block 662, the absorbent article application 144 may confirm proper placement of the absorbent article or instruct the consumer to attempt again.

The methods of the invention can be used with any suitable feminine hygiene article. Suitable absorbent articles include any type of structures, from a single absorbent layer to more complex multi layer structures. Certain absorbent articles typically include a fluid pervious topsheet, a backsheet, which may be fluid impervious and/or may be water vapour and/or gas pervious, and an absorbent element often called "core" comprised there between.

The topsheet may be manufactured from a wide range of materials such as woven and nonwoven materials; polymeric materials such as apertured formed thermoplastic films, apertured plastic films, and hydroformed thermoplastic films; porous foams; reticulated foams; reticulated thermoplastic films; and thermoplastic scrims. Suitable woven and nonwoven materials can be included of natural fibers (e.g., wood or cotton fibers), synthetic fibers (e.g., polymeric fibers such as polyester, polypropylene, or polyethylene fibers) or from a combination of natural and synthetic fibers. In one embodiment, the topsheet may be made of a hydrophobic material to isolate the wearer's skin from liquids which have passed through the topsheet. If the topsheet is made of a hydrophobic material, at least the upper surface of the topsheet is treated to be hydrophilic so that liquids can transfer through the topsheet more rapidly. This diminishes the likelihood that body exudates can flow off the topsheet rather than being drawn through the topsheet and being absorbed by the absorbent core. In one embodiment, the topsheet can be rendered hydrophilic by treating it with a surfactant. Suitable methods for treating the topsheet with a surfactant include spraying the topsheet material with the surfactant and immersing the material into the surfactant.

The topsheet can include an apertured formed film. Apertured formed films can be used for the topsheet because they are pervious to body exudates and yet non-absorbent and have a reduced tendency to allow liquids to pass back through and rewet the wearer's skin Thus, the surface of the formed film which is in contact with the body remains dry, thereby reducing body soiling and creating a more comfortable feel for the wearer. Suitable formed films are described in U.S. Pat. No. 3,929,135, entitled "Absorptive Structures Having Tapered Capillaries", issued to Thompson on Dec. 30, 1975; U.S. Pat. No. 4,324,246 entitled "Disposable Absorbent Article Having A Stain Resistant Topsheet", issued to Mullane, et al. on Apr. 13, 1982; U.S. Pat. No. 4,342,314 entitled "Resilient Plastic Web Exhibiting Fiber-Like Properties", issued to Radel, et al. on Aug. 3, 1982; U.S. Pat. No. 4,463,045 entitled "Macroscopically Expanded Three-Dimensional Plastic Web Exhibiting Non-Glossy Visible Surface and Cloth-Like Tactile Impression", issued to Ahr, et al. on Jul. 31, 1984; and U.S. Pat. No. 5,006,394 "Multilayer Polymeric Film" issued to Baird on Apr. 9, 1991.

The absorbent core can be any absorbent member which is generally compressible, conformable, non-irritating to the wearer's skin, and capable of absorbing and retaining body fluids. The absorbent core may be manufactured in a wide variety of sizes and shapes (e.g., rectangular, hourglass, "T"-shaped, asymmetric, etc.) and from a wide variety of liquid-absorbent materials commonly used in disposable pull-on garments and other absorbent articles such as comminuted wood pulp which is generally referred to as airfelt. Examples of other suitable absorbent materials include creped cellulose wadding; meltblown polymers including coform; chemically stiffened, modified or cross-linked cellulosic fibers; tissue including tissue wraps and tissue laminates; absorbent foams; absorbent sponges; superabsorbent polymers; absorbent gelling materials; or any equivalent material or combinations of materials.

The configuration and construction of the absorbent core may vary (e.g., the absorbent core may have varying caliper zones, a hydrophilic gradient, a superabsorbent gradient, or lower average density and lower average basis weight acquisition zones; or may include one or more layers or structures). Further, the size and absorbent capacity of the absorbent core may also be varied to accommodate wearers ranging from infants through adults. However, the total absorbent capacity of the absorbent core should be compatible with the design loading and the intended use of the absorbent article.

The absorbent core may include other optional components. One such optional component is the core wrap, i.e., a material, typically but not always a nonwoven material, which either partially or totally surrounds the core. Suitable core wrap materials include, but are not limited to, cellulose, hydrophilically modified nonwoven materials, perforated films and combinations thereof.

The backsheet can comprise a liquid impervious film. The backsheet can be impervious to liquids (e.g., body fluids) and can be typically manufactured from a thin plastic film. However, typically the backsheet can permit vapours to escape from the disposable article. In an embodiment, a microporous polyethylene film can be used for the backsheet. A suitable microporous polyethylene film is manufactured by Mitsui Toatsu Chemicals, Inc., Nagoya, Japan and marketed in the trade as PG-P.

One suitable material for the backsheet can be a liquid impervious thermoplastic film having a thickness of from about 0.012 mm (0.50 mil) to about 0.051 mm (2.0 mils), for example including polyethylene or polypropylene. Typically, the backsheet can have a basis weight of from about 5 g/m$^2$ to about 35 g/m$^2$. However, it should be noted that other flexible liquid impervious materials may be used as the backsheet. Herein, "flexible" refers to materials which are compliant and which can readily conform to the general shape and contours of the wearer's body.

The backsheet can be typically positioned adjacent the outer-facing surface of the absorbent core and can be joined thereto by any suitable attachment device known in the art. For example, the backsheet may be secured to the absorbent core by a uniform continuous layer of adhesive, a patterned layer of adhesive, or an array of separate lines, spirals, or spots of adhesive. Illustrative, but nonlimiting adhesives, include adhesives manufactured by H. B. Fuller Company of St. Paul, Minn., U.S.A., and marketed as HL-1358J. An example of a suitable attachment device including an open pattern network of filaments of adhesive is disclosed in U.S. Pat. No. 4,573,986 entitled "Disposable Waste-Containment Garment", which issued to Minetola et al. on Mar. 4, 1986. Another suitable attachment device including several lines of adhesive filaments swirled into a spiral pattern is illustrated by the apparatus and methods shown in U.S. Pat. No. 3,911,173 issued to Sprague, Jr. on Oct. 7, 1975; U.S. Pat. No. 4,785,996 issued to Ziecker, et al. on Nov. 22, 1978; and U.S. Pat. No. 4,842,666 issued to Werenicz on Jun. 27, 1989. Alternatively, the attachment device may include heat bonds, pressure bonds, ultrasonic bonds, dynamic mechanical bonds, or any other suitable attachment device or combinations of these attachment devices.

The backsheet may be additionally secured to the topsheet by any of the above-cited attachment devices.

The absorbent article may also include such other suitable features as are known in the art including, but not limited to, re-closable fastening system, lotion, acquisition layers, distribution layers, wetness indicators, sensors, elasticized waist bands and other similar additional elastic elements and the like, belts and the like, waist cap features, containment and aesthetic characteristics and combinations thereof.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A method for applying an absorbent article, the method comprising the steps of:
    a. providing an absorbent article;
    b. placing the absorbent article in an undergarment in a manner understood by an individual prior to wearing;
    c. capturing a still or video image of the absorbent article on the undergarment;
    d. submitting the still or video image of the absorbent article; and
    e. receiving output regarding the placement of the absorbent article.

2. The method of claim 1, wherein the method further comprises placing the absorbent article in accordance with the output and repeating steps c through e until the output received confirms proper placement of the absorbent article.

3. The method of claim 1, wherein the absorbent article comprises a feminine hygiene pad, pantiliner, sanitary napkin, topsheet, or incontinence device.

4. The method of claim 1, wherein the step of submitting still or video image data of the absorbent article comprises:
    a. centering the undergarment;
    b. capturing the still or video image data; and
    c. submitting the still or video image data using a computing device.

5. The method of claim 1, wherein the steps of submitting the still or video image of the absorbent article and receiving output regarding the placement of the absorbent article comprise using a computing device.

6. The method of claim 5, wherein the output regarding the placement of the absorbent article comprises a virtual frame.

7. The method of claim 5, wherein the computing device is
    a) a mobile device, tablet or handheld computer, the computing device comprising:
        i) a processor;
        ii) a display; and
        iii) a memory;
    wherein the memory stores an application, which, when executed by the processor, configures the mobile device to perform a set of acts comprising:
        1) receiving a set of questions specified from a remote computing device;

2) allowing a user of the computing device to submit a form comprising the one or more questions and the still or video image data to a remote server;

b) the remote server, the remote server comprising a processor and a memory, and configured, via instructions stored in the memory, to perform a set of acts comprising:

i) sending the set of questions specified remotely from a computer to the computing device; and ii) receiving, from the computing device, the output data.

8. The method of claim 1, wherein the output regarding the placement of the absorbent article is tailored according to information supplied by a consumer.

9. The method of claim 1, wherein the output regarding the placement of the absorbent article is tailored according to information previously obtained regarding stain location, stain area, stain pattern, soiling of the undergarment, change frequency, or pad placement.

10. The method of claim 1, wherein the output regarding the placement of the absorbent article is tailored according to print signals on the absorbent article.

11. A method for placing an absorbent article, the method comprising the steps of:
   a. providing an absorbent article and an undergarment;
   b. submitting information about the absorbent article to an absorbent article application on a computing device;
   c. submitting information about the undergarment to the absorbent article application on a computing device;
   d. receiving output regarding the placement of the absorbent article in an undergarment; and
   e. placing the absorbent article in the undergarment in accordance with the output.

12. The method of claim 11, wherein the absorbent article comprises a feminine hygiene pad, pantiliner, sanitary napkin, topsheet, or incontinence device.

13. The method of claim 11, wherein the method further comprises acquiring still or video image data for submission.

14. The method of claim 13, wherein the step of acquiring a still or video image data for submission further comprises:
   a. centering the undergarment;
   b. capturing the still or video image data; and
   c. uploading the still or video image data using a computing device.

15. The method of claim 13, wherein the steps of submitting information about the absorbent article to an absorbent article application on a computing device and receiving output regarding the placement of the absorbent article in an undergarment comprise using a computing device.

16. The method of claim 13, wherein the still or video image data uploaded to the server is password protected.

17. The method of claim 11, wherein the method further comprises choosing information about the undergarment and about the absorbent article from a drop down menu selection.

18. The method of claim 11, wherein the computing device is
   a) a mobile device, tablet or handheld computer, the computing device comprising:
      i) a processor;
      ii) a display; and
      iii) a memory;
   wherein the memory stores an application, which, when executed by the processor, configures the mobile device to perform a set of acts comprising:
      1) receiving a set of questions specified from a remote computing device;
      2) allowing a user of the computing device to submit a form comprising the one or more questions and the still or video image data to a remote server;
   b) the remote server, the remote server comprising a processor and a memory, and configured, via instructions stored in the memory, to perform a set of acts comprising:
      i) sending the set of questions specified remotely from a computer to the computing device; and
      ii) receiving, from the computing device, the output data.

19. The method of claim 11, wherein the output regarding the placement of the absorbent article is tailored according to information previously obtained by still or video image data regarding stain location, stain pattern, stain area, soiling of the undergarment, change frequency, or pad placement.

20. The method of claim 11, wherein the output received is tailored to an individual consumer and a time in their cycle.

* * * * *